UNITED STATES PATENT OFFICE.

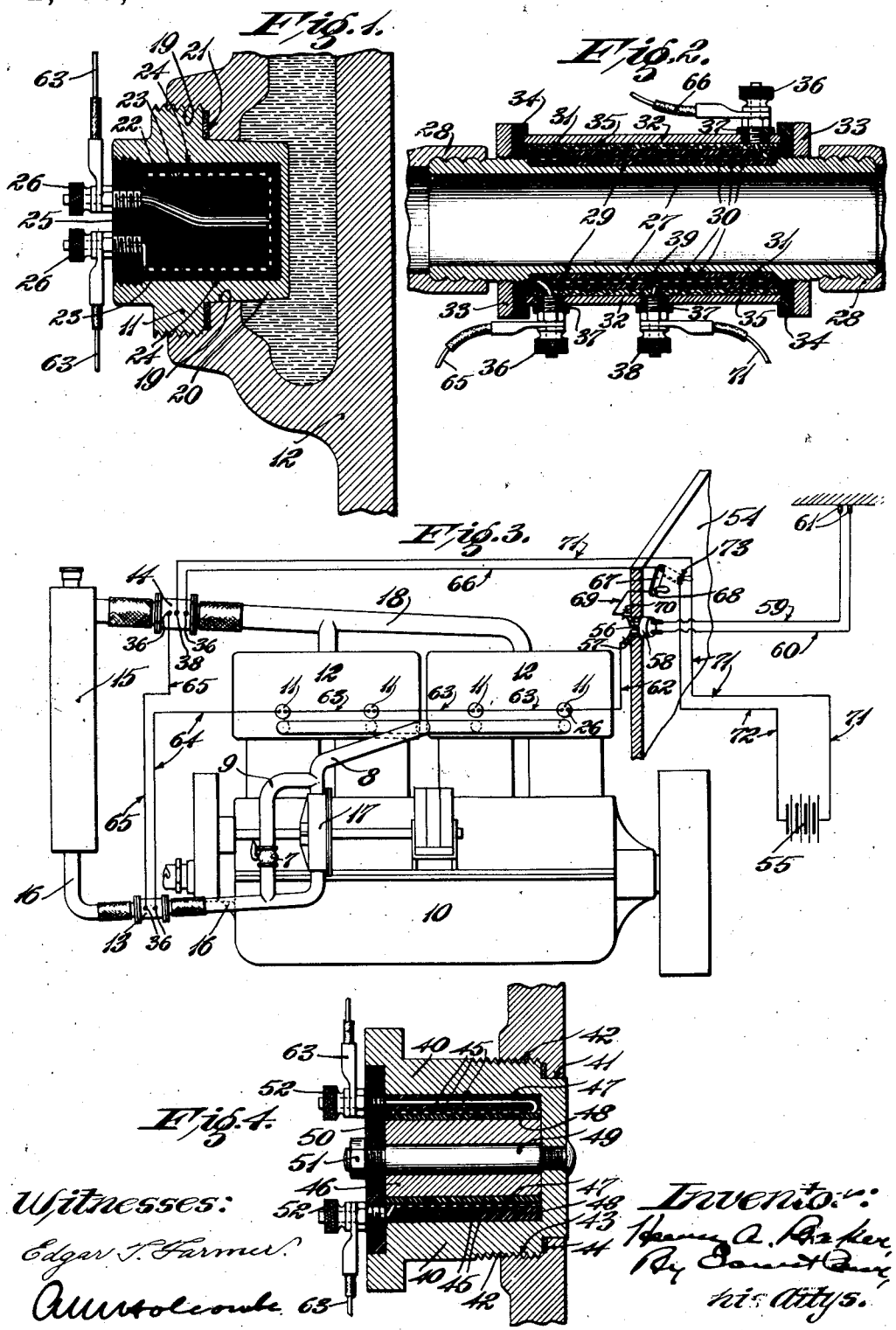
H. A. BAKER.
AUTOMOBILE.
APPLICATION FILED JAN. 26, 1912.
1,079,320.
Patented Nov. 25, 1913.

HENRY A. BAKER, OF ST. LOUIS, MISSOURI.

AUTOMOBILE.

1,079,320.     Specification of Letters Patent.     Patented Nov. 25, 1913.

Application filed January 26, 1912. Serial No. 673,694.

*To all whom it may concern:*

Be it known that I, HENRY A. BAKER, a citizen of the United States, and a resident of the city of St. Louis and State of Missouri, have invented a new and useful Improvement in Automobiles, of which the following is a specification.

My invention relates to gasolene automobiles, and has for its object the prevention from freezing of the water used for cooling the engine cylinders of such an automobile.

There is no likelihood of freezing while the automobile is in frequent use, as the heat produced in the engine cylinder while running is sufficient to keep the water warm for some little time after stopping, but when the automobile is out of use for considerable periods in cold weather, as when left standing in the street for several hours, or when stabled overnight in a cold garage, unless measures are taken to keep the water warm or to prevent its freezing by the use of anti-freezing mixtures the danger of freezing and consequent stopping of water circulation, if not the cracking of some part of the engine, is immediate.

The use of anti-freezing mixtures in automobile cooling systems is attended with considerable annoyance to the user, and in some instances the solution used has a deleterious effect on the pipes and rubber connections of such systems. At best these solutions merely reduce, and do not entirely eliminate, the likelihood of freezing of the cooling water and injury to the automobile resulting therefrom, in cold weather.

I accomplish my object by inserting at one or more points in the cooling water system electric heating devices adapted to be operated with electric current from a storage battery carried on the automobile or from the electric lighting circuit of the garage or other place of storage for the automobile.

My invention also relates to the details of construction and arrangement of parts whereby this object is accomplished, as more fully set forth in the following description, and as is pointed out with particularity in the claims forming part of this specification.

My invention is not restricted to automobiles, though particularly designed for such use, but may be applied to any explosion engine or other device equipped with a water cooling system and likely to be exposed to freezing temperatures while not in operation.

In the accompanying drawings illustrating an embodiment of my invention, in which drawings like characters are used to designate like parts throughout the several views, Figure 1 is a vertical section through a part of a water cooled cylinder of an explosion engine showing a heating plug inserted therein; Fig. 2 is a longitudinal section through a part of a hose connection in a cooling water system showing a heating tube inserted therein; Fig. 3 is a diagrammatic view of a water cooled explosion engine showing the arrangement of mechanical and electrical parts and connections, in an automobile fitted with my invention; and Fig. 4 is a vertical section through a modified form of heating plug adapted to be used in my system.

Referring to Fig. 3 of the drawings, my invention is shown as applied to automobiles in which an explosion engine 10 having water jacketed cylinders 12 is fitted with a cooling water circulating system comprising the radiator 15, piping 16 leading from the radiator to the pump 17 and cylinder castings, and piping 18 leading from the tops of the cylinder castings back to the radiator. The cooling water flows by convection due to the heat generated in the cylinders from the radiator through the piping 16, pump 17, piping 8, cylinder castings 12, and piping 18 back to the radiator, passing through the heating tubes 13, 14, and is assisted in this flow by the pump 17. A bypass pipe 9 fitted with a stop cock 7, normally closed, is connected around the pump 17 when this pump, on account of its form of construction, will not admit of a free flow of water through it, so that circulation of the cooling water can take place through the system when the pump is not working by opening the stop cock. Into this cooling water circulating system, at suitable points to promote the flow of water by convection or thermal circulation, which points should be located on pipes inclined upwardly in the direction of flow of the water, I introduce electrical means for heating the water when the engine is inoperative, thus maintaining thermal circulation and preventing freezing of the water.

My invention comprises heating plugs 11 attached to the water-jackets of the respective cylinders, and heating tubes 13, 14 arranged in the piping of the circulating system and forming a part thereof. The heating plugs and heating tubes need not be used conjointly, but either may be used alone with good results.

The heating plugs 11 for warming the engine cylinders 12 are screwed into holes 19 in the lower part of the water jackets surrounding the cylinders, which holes are counterbored and tapped for the purpose. The plugs have threaded shoulders engaging the tapped and counterbored holes and tapered portions 20 extending into the water space of the cylinder castings. Between the shoulders and bottoms of the tapped and counterbored holes 19 are arranged gaskets or other forms of packing 21. The inside of the plug is hollowed out and a porcelain core 22 having a coil of resistance wire 23 wound thereon, covered with layers of insulation 24, such as mica, is inserted therein and secured by means of a threaded disk 25 of hard fiber or other insulating material. Upon the disk are mounted binding posts 26 to which the ends of the resistance wire 23 are secured.

The heating tubes 13, 14, comprise an inner tubular body 27 adapted to be secured at the ends in the rubber hose connections 28 forming a part of the water circulating system of the automobile. This inner member is wrapped for the most part with insulation 29 and surrounded by a coil of resistance wire 30 and another layer of insulation 31. A layer of mineral wool or other heat insulating substance 35 surrounds the second layer of insulation and an outside casing 32 covers the several layers and is secured at the ends by means of nuts 33 threaded upon the ends of the inner member 27. Between the nuts and ends of the casing 32 are arranged washers 34 of hard fiber or other insulating material. Binding posts 36 are mounted upon the casing and insulated therefrom by means of bushings 37 of fiber or other insulating material, to which binding posts the ends of the coil of resistance wire 30 are secured. A similar binding post 38 is mounted on the casing and a connection 39 from this binding post is tapped into the heating coil 30 at a point intermediate its ends.

In the form of heating plug shown in Fig. 4 the body 40 is substantially cylindrical and is formed with a shouldered portion 41 and threaded portion 42 adapted to coöperate with a threaded counterbored hole 43 in the wall of the water jacket of a cylinder, a gasket 44 being arranged between the two parts. The body portion 40 is made hollow and a heating coil 45 wound on an iron core 46 and insulated by layers of insulation 47, 48 is arranged therein. A stud 49 threaded and shouldered at both ends is screwed into the bottom of the body portion 40 and the inner end riveted over. The other end projects through the iron core 46, and the core and heating coil are secured in place by means of an insulating washer 50 and nut 51. The ends of the resistance wire forming the heating coil 45 are brought through this insulating washer 50 and connected to binding posts 52 mounted thereon. This form of heating plug is adapted for use where the water jacket space is not wide enough to permit the plug to project into it, and may be inserted in the holes ordinarily left in the lower sides of water jacketed cylinders for supporting the cores during the operation of founding. Thus my heating system may be applied to existing types of automobile engines where no special provision has been made in the walls of the cylinder castings to accommodate the plugs.

In applying my invention to automobiles of the usual type which are provided with a battery, indicated diagrammatically in Fig. 3, at 55, I make use of this battery to provide electric current for operating my device when the automobile is removed from other sources of electric current, but I prefer to use as a source of electric current the electric lighting circuit of the garage or other place in which the automobile is most frequently stored. For this purpose, I provide a socket 56 on the dashboard 54, or other convenient location upon the automobile, into which socket may be inserted an ordinary plug 58 attached to a flexible cord containing wires 59, 60, leading to an outlet 61 or other fixture embraced in the lighting circuit. From one of the terminals 57 of the socket 56 I lead a wire 62 to one of the binding posts 26 of the plug 11 in the nearest cylinder casting. The other one of the binding posts 26 is connected by a wire 63 with one of the binding posts of the next adjacent plug, which in turn is connected up with the third and fourth plugs in the same manner, the current passing through the four plugs in series. From the last plug of the series a wire 64 is led to one of the binding posts 36 of the heating tube 13 and a wire 65 leads from the other binding post 36 of this heating tube to one of the binding posts 36 of the heating tube 14. From the other binding post 36 of the heating tube 14 a wire 66 leads to a two-pole switch 67 arranged upon the dash. One of the poles 68 of this switch is connected by a wire 69 with the terminal 70 of the socket 56, so that when the plug 58 is inserted in this socket a current of electricity from the lighting circuit passes through the four heating plugs and the two heating tubes in series. A wire 71 leads from the binding post 38 of the heating tube 14 to one pole of the automobile battery 55. The other pole of the battery is connected by a wire 72 with the second pole 73 of the two-pole switch 67 so that when this switch is thrown to make contact at the pole 73 an electric current from the battery 55 passes through a part of the resistance wire in the heating tube 14. This arrangement enables the current of comparatively low voltage from the battery to be used to advantage by concentrating it in the heating tube 14, while if this low voltage current were passed through all the resistance coils it would have comparatively little heating effect.

From the foregoing description it is evident that numerous modifications may be made in the form of the electric heaters employed and that the points of location of the heating devices and arrangements of the electric circuits may be varied without departing from the mode of operation invented by me, and I do not wish to limit myself to the specific forms and arrangement of apparatus herein described.

What I desire to claim and secure by Letters Patent is as follows:

1. In a water cooling system for water jacketed explosion engines in combination with the engine casing a radiator and oppositely sloping ducts between the top and bottom of said radiator and the engine casing, a plurality of electric heating means and means for supplying electricity thereto, one of said heating means being located in each duct whereby thermal circulation is produced through the entire cooling system.

2. In an automobile having an explosion motor comprising a water cooling system, in combination with said cooling system, an electric battery, means forming a part of said water cooling system for transforming electric energy into heat, electrical connections between said battery and said means embracing a two-pole switch, and electrical connections adapted to include a fixed source of electric current also controlled by said two-pole switch.

3. In a water cooling system for motors comprising a closed water circulating circuit in combination with said circuit, a duct forming a part thereof, said duct having one end higher than the other, a coil of electrical resistance wire surrounding said duct, electrical connections between the ends of said coil and a fixed source of electric current, and an electrical connection between said coil intermediate its ends and one of the ends of the coil, said last mentioned connection being adapted to include a portable electric battery, and means for breaking the said connections.

4. In a water cooling system for motors comprising a closed water circulating circuit in combination with said circuit, a duct forming a part thereof, said duct having one end higher than the other, a coil of electrical resistance wire surrounding said duct, electrical connections between the ends of said coil and a fixed source of electric current, and an electrical connection between said coil intermediate its ends and one of the ends of the coil, said last mentioned connection adapted to include a portable electric battery, and means for breaking the last mentioned connection when the connection with the fixed source of electric current is made.

5. In a water cooling system for motors comprising a closed water circulating circuit in combination with said circuit, a duct forming a part thereof, said duct having one end higher than the other, a coil of electrical resistance wire surrounding said duct, electrical connections between the ends of said coil and a fixed source of electric current, and an electrical connection between said coil intermediate its ends and one of the ends of the coil, said last mentioned connection adapted to include a portable electric battery, and means whereby the fixed source of power and the battery cannot be in circuit simultaneously.

6. In an automobile, a water jacketed explosion engine, a thermo-siphon water circulating system for said engine comprising a radiator and oppositely sloping ducts connecting said radiator with said engine, heating means forming a part of said engine water jacket, and heating means forming a part of said circulating system and positioned in said ducts between said radiator and engine water jacket, whereby said heating means compel circulation of water through the entire circulating system.

7. In an automobile, a water jacketed explosion engine, a thermo-siphon water circulating system for said engine comprising a radiator and oppositely sloping ducts connecting said radiator with said engine, electric heating means forming a part of said engine water jacket, and electric heating means associated with said ducts whereby said heating means compel circulation of water through the entire circulating system, and means for supplying electric current to said heating means.

Signed at St. Louis, Missouri, this 24th day of January, 1912.

HENRY A. BAKER.

Witnesses:
A. M. HOLCOMBE,
PAULINE AMBERG.